No. 873,835. PATENTED DEC. 17, 1907.
C. E. & H. W. BOWER.
BALE TYING MECHANISM FOR BALING PRESSES.
APPLICATION FILED FEB. 2, 1907.
8 SHEETS—SHEET 1.
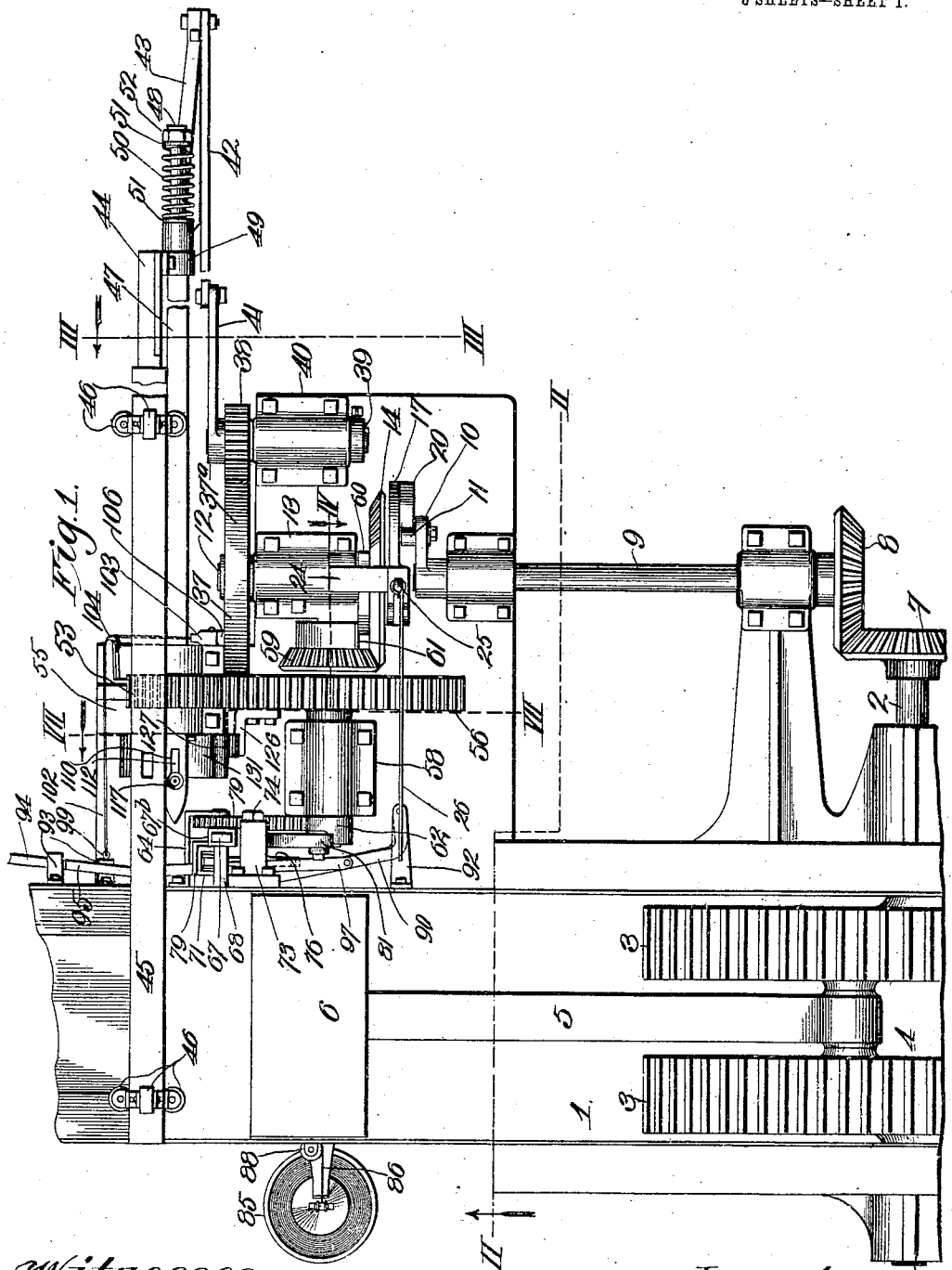
Witnesses
Inventors:
C. E. Bower & H. W. Bower
By
George W. Thorpe
Atty No. 873,835. PATENTED DEC. 17, 1907.
C. E. & H. W. BOWER.
BALE TYING MECHANISM FOR BALING PRESSES.
APPLICATION FILED FEB. 2, 1907.
8 SHEETS—SHEET 2.
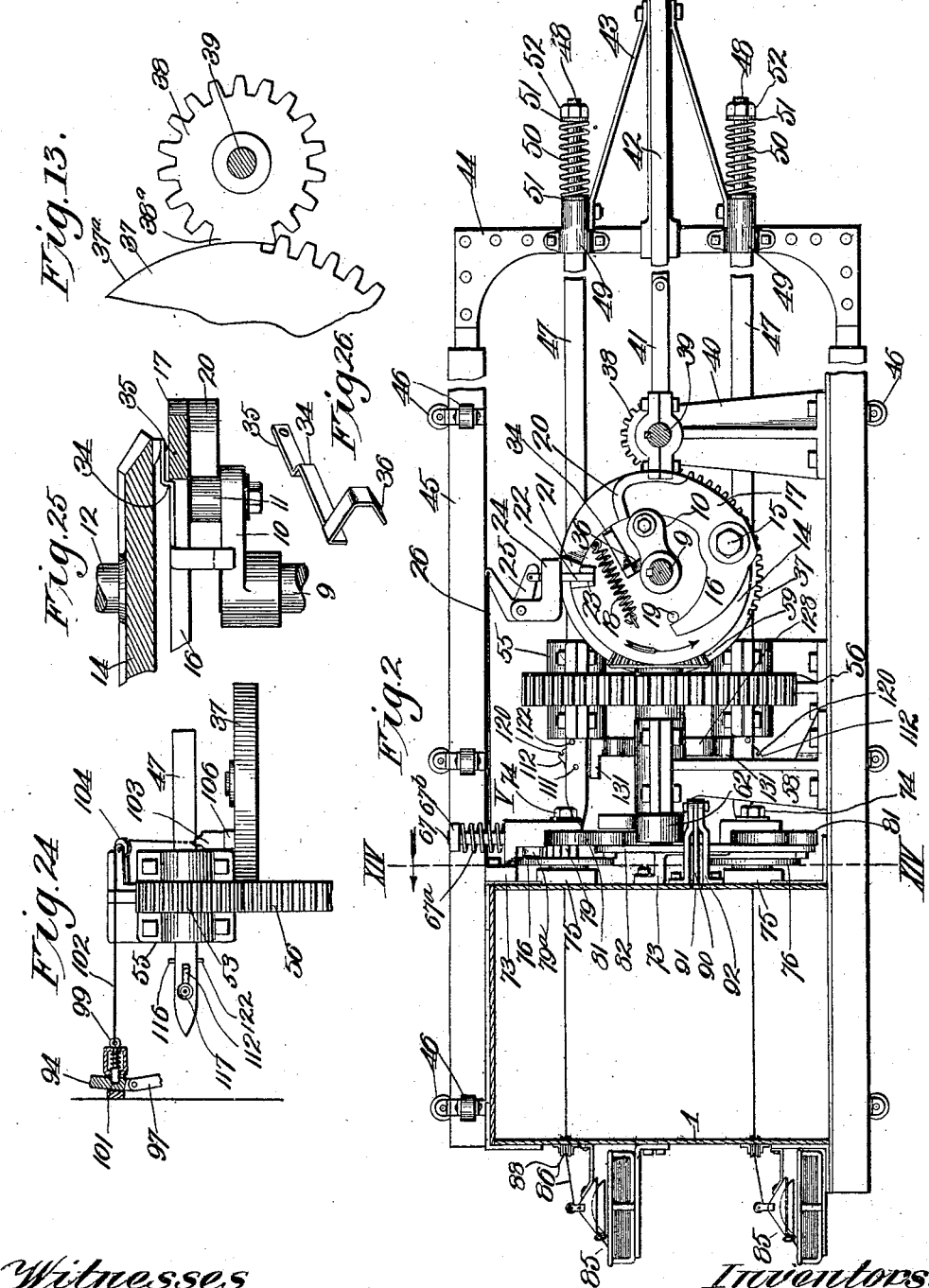
Witnesses
Frank P. Glore
H. C. Rodgers
Inventors:
C. E. Bower & H. W. Bower
By George J. Thorpe
Atty.

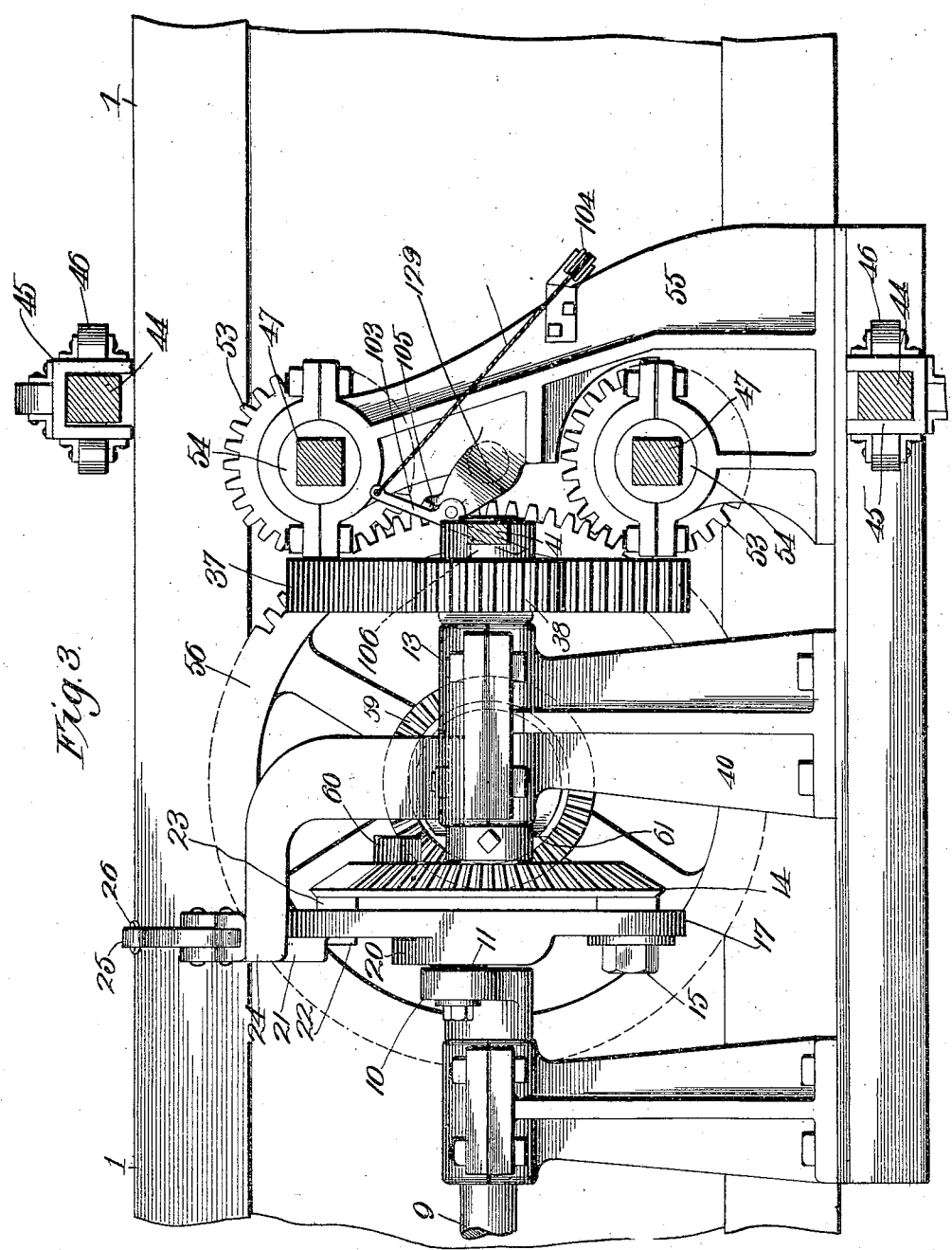

No. 873,835.

PATENTED DEC. 17, 1907.

C. E. & H. W. BOWER.
BALE TYING MECHANISM FOR BALING PRESSES.
APPLICATION FILED FEB. 2, 1907.

8 SHEETS—SHEET 4.

Witnesses
Frank R Glore
H. C. Rodgers

Inventors:
C. E. Bower and H. W. Bower
By George H Thorpe Atty

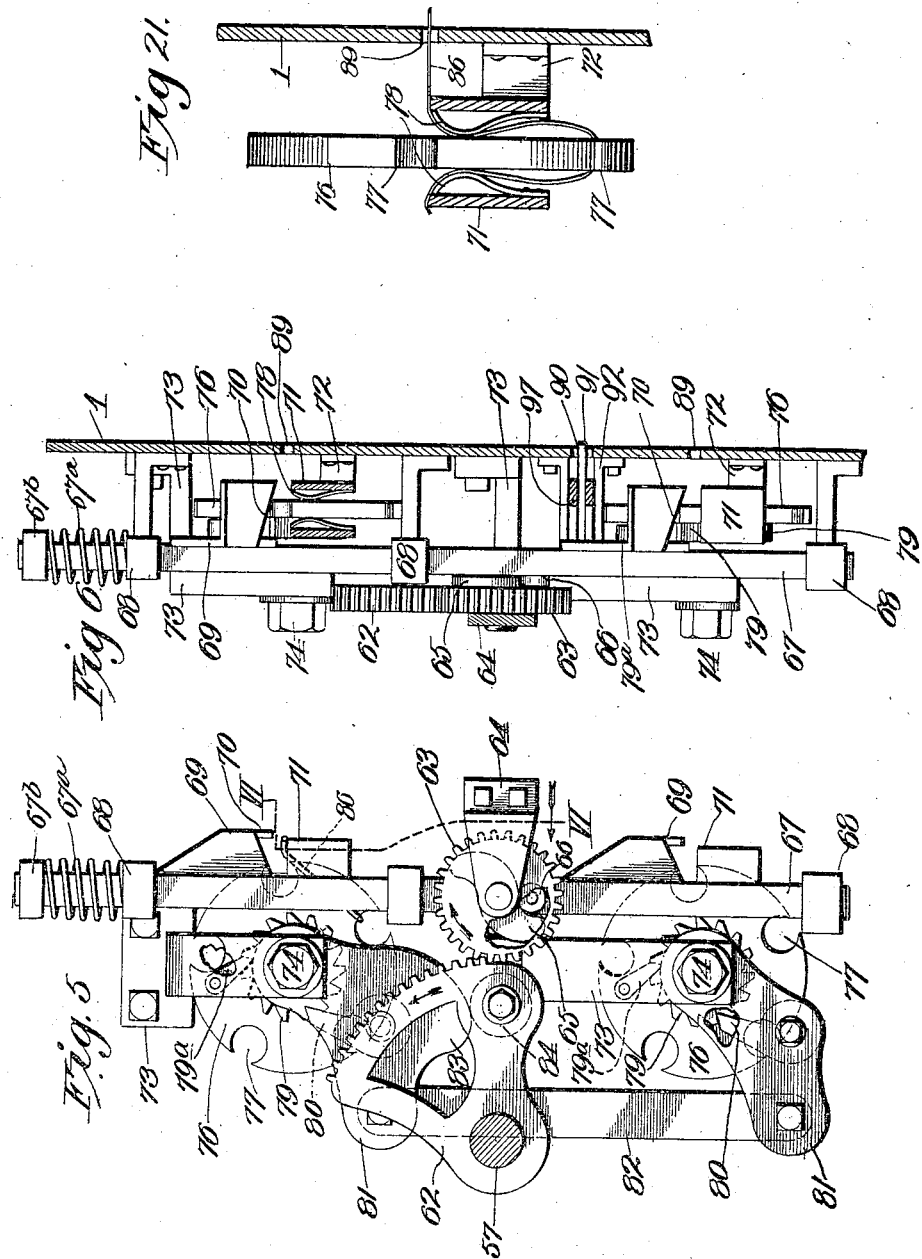

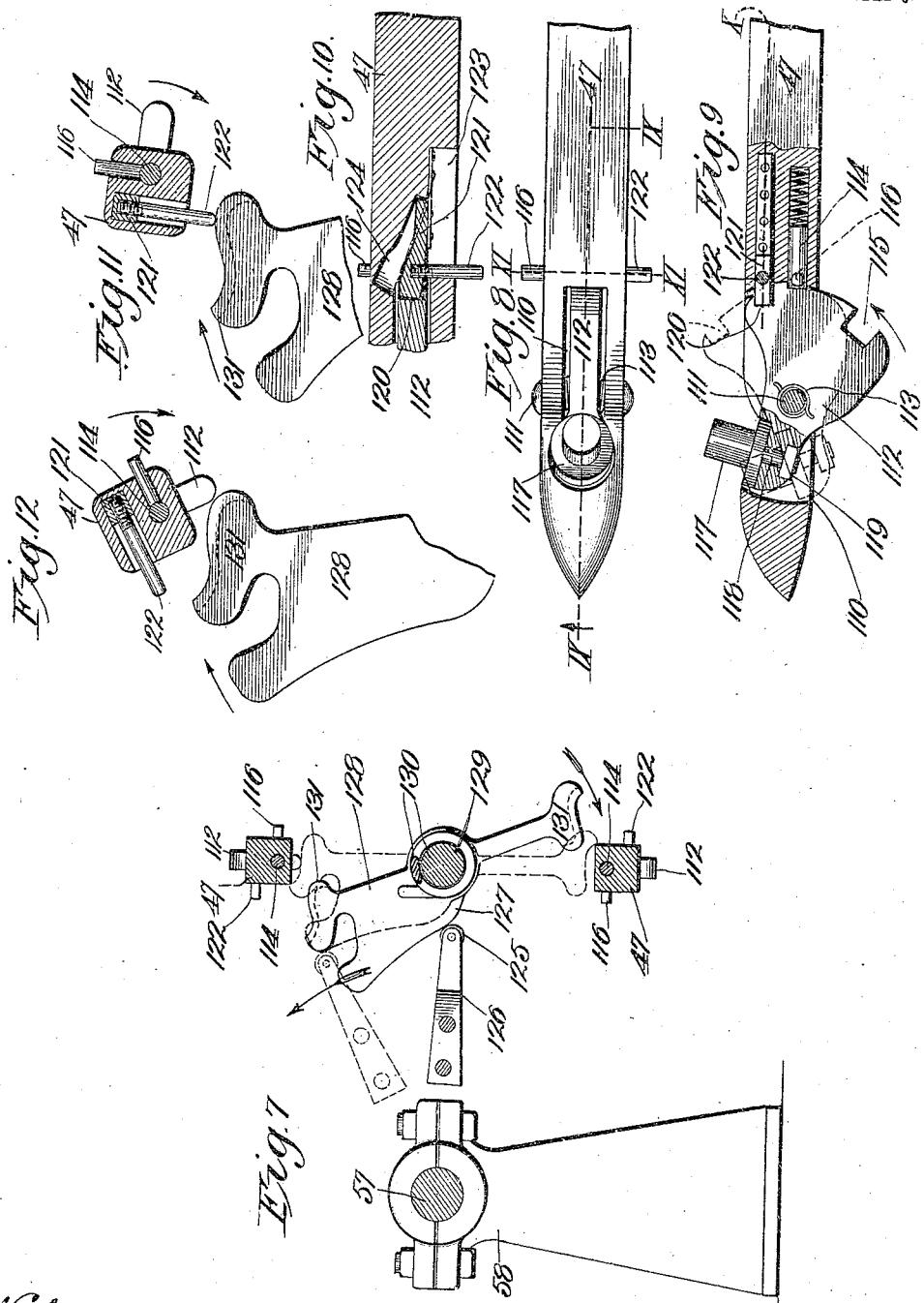

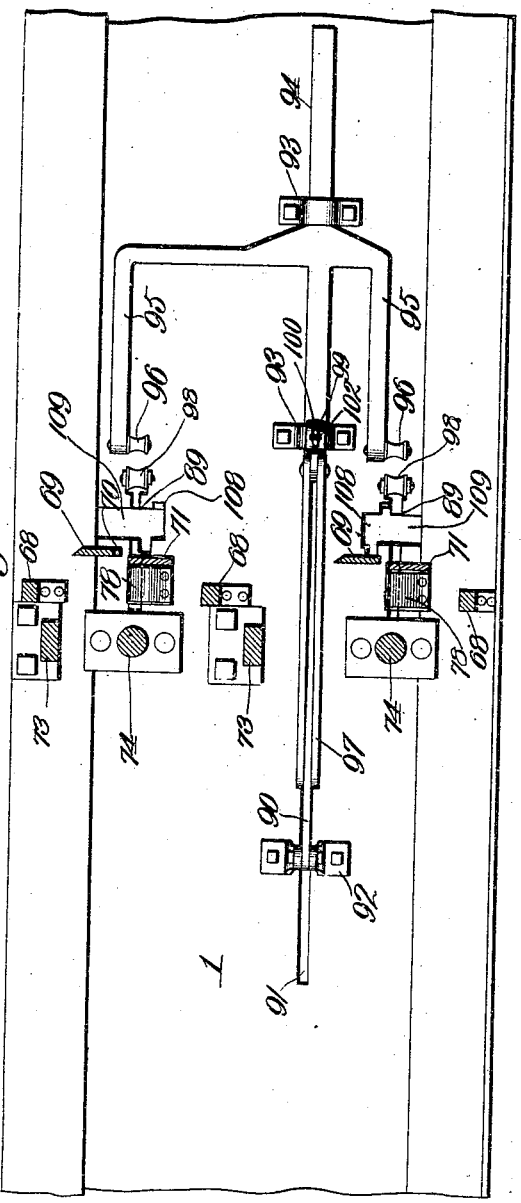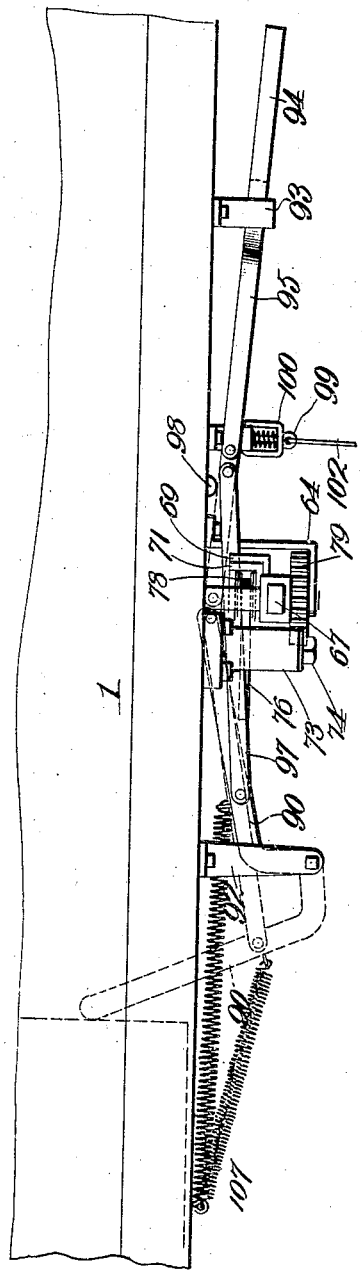

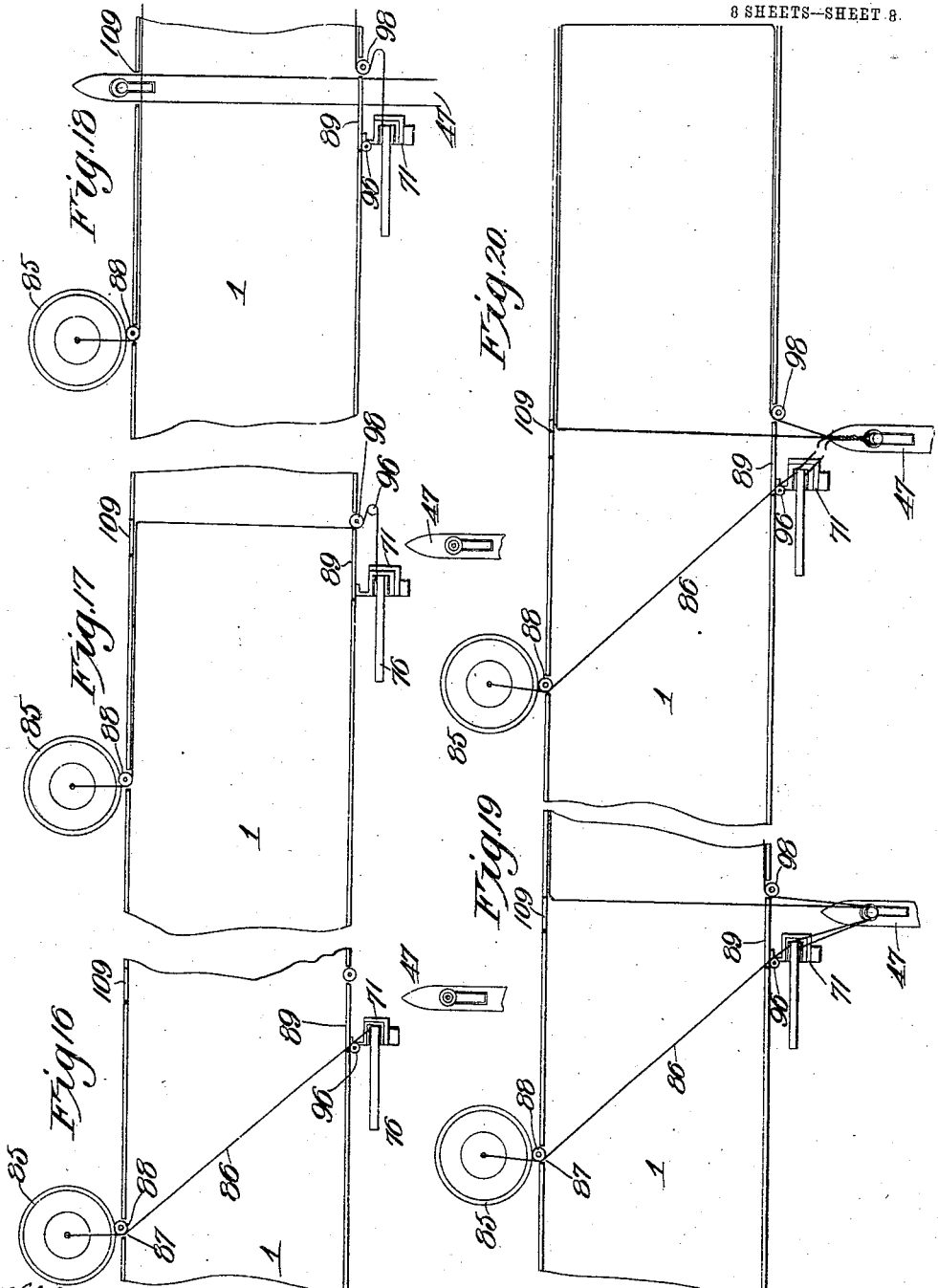

UNITED STATES PATENT OFFICE.

CLARENCE E. BOWER, OF NEWTON, IOWA, AND HOWARD W. BOWER, OF OLNEY, ILLINOIS.

BALE-TYING MECHANISM FOR BALING-PRESSES.

No. 873,835.   Specification of Letters Patent.   Patented Dec. 17, 1907.

Application filed February 2, 1907. Serial No. 355,400½.

To all whom it may concern:

Be it known that we, CLARENCE E. BOWER and HOWARD W. BOWER, citizens of the United States, residing, respectively, at Newton, Jasper county, Iowa, and Olney, county of Richland, and State of Illinois, have invented certain new and useful Improvements in Bale-Tying Mechanism for Baling-Presses, of which the following is a specification.

Our invention relates to bale-tying mechanism for baling presses, and has for its object to produce efficient and reliable means for automatically and reliably disposing wire around the bales as they are successively formed, doubling the ends of the wires and twisting the same reliably together at the doubled points so that the twist of each wire shall consist of four strands.

With these general objects in view and others of a tributary character the invention consists in certain novel and peculiar features of construction and organization as hereinafter described and claimed; and in order that it may be fully understood reference is to be had to the accompanying drawings, in which—

Figure 22:
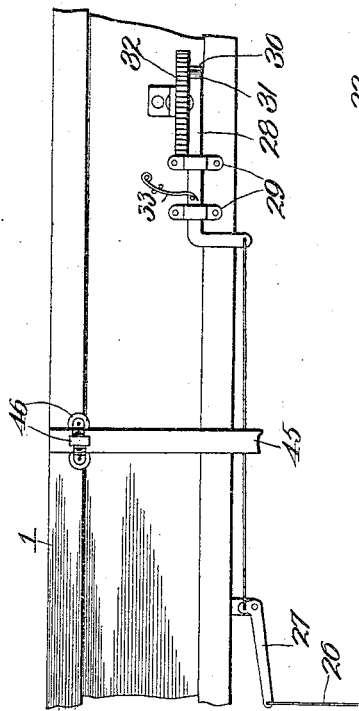
Figure 23:
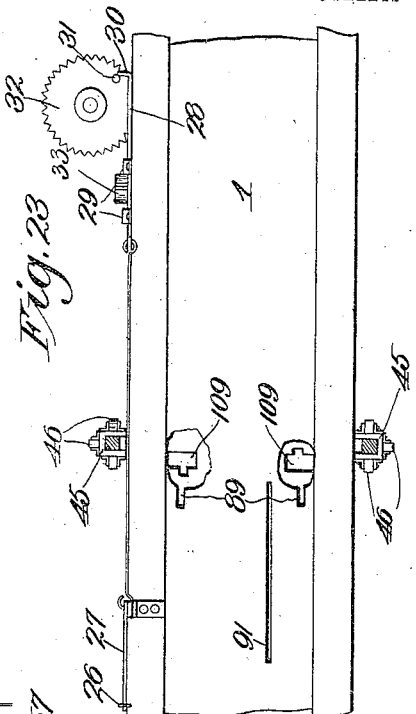
Figure 4:
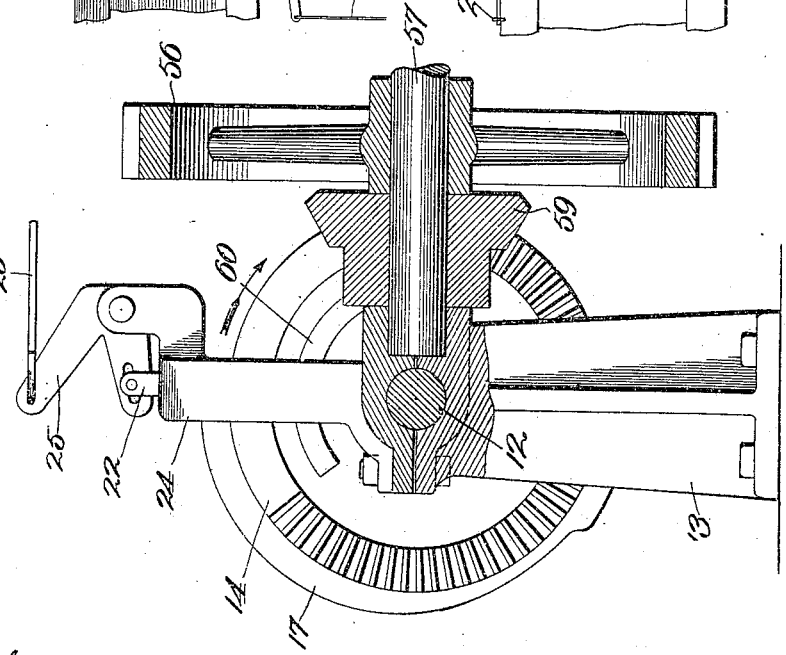

Figure 1, is a top plan view of a portion of a baling press equipped with our invention. Fig. 2, is a section on the line II—II of Fig. 1. Fig. 3, is an enlarged section taken approximately on the line III—III of Fig. 1. Fig. 4, is an enlarged section taken on the dotted line IV of Fig. 1. Fig. 5, is an enlarged view taken on the dotted line V of Fig. 2. Fig. 6, is a section on the line VI—VI of Fig. 5. Fig. 7, is a section on line VII—VII of Fig. 1. Fig. 8, is an enlarged plan view of a part of the lower needle. Fig. 9 is a section on line IX—IX of Fig. 8. Fig. 10, is a section on dotted line X of Fig. 9. Fig. 11 is an enlarged view of a portion of Fig. 7 on the line XI—XI of Fig. 8 with the parts in the positions they occupy during the last revolution which the needles makes in the wire twisting or knotting operation. Fig. 12, is a similar view of said parts in the position they occupy just prior to the completion of the last revolution of the needle in its wire twisting or knotting operation. Fig. 13, is a view showing the construction and relation of certain gear wheels whereby reciprocatory movement of the needles is prevented while one of the wheels makes part of a revolution. Fig. 14, is a view taken on the line XIV—XIV of Fig. 2. Fig. 15 is a plan view of a portion of the case and of the parts shown in Fig. 14 and other parts hereinafter referred to. Fig. 16, is a diagrammatic plan of the baling case, reel, needle and other parts, with the wire in the position it occupies before the introduction of the baling material into the case. Fig. 17 is a similar view with the wire in the position to which it is pushed by the first charge of the baling material and provided with a kink at the side of the case to provide the necessary slack for the twisting or knotting operation. Fig. 18 is a similar view with the wire in the position it occupies after the last charge forming the bale has been introduced, the needle being also shown as advanced across the case behind the bale preliminary to drawing the wires across the rear end of the latter. Fig. 19 is a similar view with the wire in the position it occupies as the needle withdraws to its original position preliminary to twisting or knotting the wire. Fig. 20, is a similar view with the wire twisted or knotted and cut preliminary to the disengagement of the completed tie from the reel. Fig. 21, is an enlarged section taken on the same line as Fig. 6 and showing the end of one of the wires clamped against its retainer disk. Fig. 22, is a plan view of a part of the baling case to show the wheel and connections thereof for determining the length of each bale. Fig. 23, is a side view of the construction shown in Fig. 22. Fig. 24, is a detail view partly in plan and partly in section to show more clearly the means for locking and unlocking the frame for providing slack in the bale wires. Fig. 25, is an enlarged view partly in plan and partly in section of the transmission mechanism. Fig. 26, is a detail perspective view of the spring forming part of said transmission mechanism.

In the said drawings 1 indicates a baling case, 2 alined shafts journaled therein, 3 large gear wheels mounted on said shafts and adapted to be driven by any suitable power not shown, 4 a crank connecting said gear wheels, 5 a beam pivoted to said crank to operate the plunger 6 of the usual or any preferred construction. 7 is a bevel gear on one of the shafts 2 meshing with the bevel gear 8 on the shaft 9 mounted in suitable bearings and provided at its rear end with a crank 10 equipped with an antifriction roller 11.

12 indicates a shaft longitudinally alined with shaft 9 and journaled in bearing 13, and provided at its front end with a mutilated bevel gear 14. 15 is a bolt carried by bevel gear 14 and forming a pivot for the rock frame consisting of oppositely projecting segmental arms 16 and 17, the latter being connected by a retractile spring 18 to the bevel gear and tending under the action of said spring to swing inward. The arm 16 by engagement with pin 19 of the bevel gear limits the outward movement of arm 17.

20 indicates a rib projecting from the front face of arm 17 and 21 a similarly projecting lug at the free end of said arm, said lug being held with a yielding pressure by spring 18 against a pin 22 resting against the outer face of the lug 23 of said bevel gear. Pin 22 is mounted slidingly in an arm, overhanging the bevel gear and rock frame, of bracket 24 secured to bearing 13 and pivoted on said pin to raise it out of or into the path of lug 21 is a bell-crank 25 mounted on said bracket 24, said bell-crank being connected by a transverse link 26 to a bell-crank 27 mounted on the baling case and connected to a slide rod 28 mounted in guides 29 to slide longitudinally of the baling case, the rear end of said slide rod having an upwardly projecting lug 30 for engagement once in each revolution by a pin 31 of a toothed wheel 32 suitably journaled above the baling case and depending into the latter so as to be rotated intermittently by the baling material, said wheel being turned part way round with each compression stroke of the plunger. One revolution of the wheel determines the length of the bale and it ordinarily requires ten feed strokes to complete such revolution. As the pin 31 makes its last step it engages lug 30 and pulls the slide bar rearward and releases it, and almost imperceptible movement of the wheel being sufficient to accomplish such purpose, said movement of the slide bar being resisted by the spring 33. The short movement of the slide bar is sufficient to raise the pin 22 out of the path of lug 21 to permit the rock frame to be pulled inward by spring 18, the inward movement of the rock frame being limited because of the shoulder 34 of spring 35 secured to bevel gear 14 and having a cam surface 36 in the path of crank arm 9, so that as said arm revolves it shall engage the cam surface 36 and force the spring toward the bevel gear until its shoulder is out of the path of the rock frame, when the latter swings inward under the pull of spring 18 until its rib 20 occupies the path of roller 11 on its next revolution.

In the interim between the tripping of the pin and the termination of the second inward movement of the rock frame 17, crank arm 10 makes a revolution and at the same time the plunger makes a stroke and forces all loose material back past the usual baling case retainers (not shown) to leave the path of the needles clear and unobstructed, the attendant omitting to deposit a charge of feed in the case previous to such stroke of the plunger. As the next revolution of the crank arm occurs its roller engages rib 20 and imparts rotative movement to the bevel gear for a purpose which hereinafter appears, and likewise to shaft 12 and the mutilated gear 37 on its rear end, said mutilated gear having sufficient teeth to impart one complete revolution to the gear wheel 38 secured on shaft 39 journaled in bearing 40 and provided at its rear end with a crank 41. The gear 38 has a wide tooth $38^a$ to engage the non-toothed surface $37^a$ of wheel 37 to guard against accidental rotation and untimely reciprocatory movement of the needles. Crank 41 is pivotally connected by link 42 to the extension 43 of transverse frame 44, said frame having its horizontal arm fitting in channel bars 45 bearing a fixed relation to and projecting laterally from the upper and lower sides of the baling case as shown most clearly in Fig. 3, said channel bars being equipped with anti-friction rollers 46 to engage each arm of the frame at its outer and side edges for the purpose of eliminating friction as far as practicable.

Between the horizontal arms of frame 44 are a pair of transversely extending needles 47 having reduced cylindrical portions 48 at their outer ends journaled in bearings 49 carried by frame 44, said needles being pressed longitudinally outward or away from the baling case by spring 50 bearing against washers 51 interposed between the springs and bearings 49 and between said springs and the nuts 52 adjustable on said reduced ends 48. The needles also extend slidingly through the rectangular bores or passages of a pair of cog wheels 53, said cog wheels having laterally projecting hub portions 54 journaled in bearing 55 having a fixed relation with the baling case. Cog wheels 53 mesh with a large gear wheel 56 secured upon a shaft 57 journaled in bearings 58 and 13 and secured rigidly on shaft 57 is a bevel gear 59 to be revolved by the teeth of the mutilated bevel gear 14 once in each revolution of the latter, accidental movement of the gear wheel 56 which would impart turning movement to the needles, being prevented by the curved rib 60 of mutilated gear 14 coming into engagement with flat face 61 of the hub of bevel gear 59. It will be apparent that part of one revolution of the shaft 12 imparts reciprocatory movement to the needles and that as such reciprocatory movement ends, the rib 60 of the bevel gear 14 passes out of engagement with the flattened face of the hub of gear 59 and permits the latter to be revolved once by the teeth of said mutilated bevel gear, the revolution of gear 59 imparting a plurality of revolutions to the needles through the medium of wheels 56 and 53.

Secured on the opposite end of shaft 57 from gear wheel 56 is a segment gear 62 which once in each revolution engages and operates a gear 63 journaled on a bracket 64 secured to the baling case and provided with a substantially S-shaped cam 65 which forms a track for an anti-friction roller 66 carried by a vertical rod 67 mounted in a guide bracket 68 secured to the baling case and held yieldingly elevated by a spring 67$^a$ disposed between the topmost guide bracket 68 and the collar 67$^b$. Guide bracket 68 is provided with angular cutting blades 69, the cutting edges 70 being pitched at an angle as shown most clearly in Fig. 6, to more effectively cut the wires, as hereinafter explained, when said blades descend past the stationary blades 71, said blades being of substantially U-shape and having angle arms 72 by which attachment is made to the baling case.

73 indicates a pair of brackets secured to the case and carried by said brackets are bolts 74 secured at their opposite ends in the blocks 75 secured to the case and journaled on said bolts between said blocks and arms are a pair of disks 76 provided with a plurality of peripheral notches 77 and of diameter to project into the stationary U-shaped cutting blades 71 and be engaged frictionally at opposite sides by the spring jaws or clamps 78 carried by said stationary blades for a purpose which hereinafter appears.

79 indicates ratchet wheels rigid with disks 76 and held against back rotation by pivoted detents 79$^a$ and engaged by the spring-actuated pawls 80 carried by arms 81 pivoted on bolts 74 and pivotally connecting by a link 82, one of said arms 81 being provided with cam portion 83 to be engaged by a roller 84 carried by a segment gear 62, so that once in each revolution of said gear, said roller shall engage said cam portion 83 and thereby simultaneously rock arms 81 and through the medium of the spring actuated pawls and said ratchet wheels impart rotary movement to the disks. In the proportion shown the disks are caused to move one-fifth of a revolution for each revolution of shaft 57 for the purpose of gripping the wires which extend from the reels. As shown most clearly in Figs. 16 to 20 inclusive, the reels are disposed at the opposite side of the case from the retainer disks 76 and forward of the latter, the reels numbered 85 being of any suitable or preferred type of construction, and from them the wires 86 extend through openings 87 and around the guide rollers 88, thence diagonally across the baling chamber through slots 89 in the opposite wall and then obliquely across the arm of the stationary U-shaped cutting blades adjacent to the baling case, the wires extending down between the juxtaposed spring jaws or clamps 78 and the retainer disks, thence transversely through the notches of said disks next below said jaws and thence upwardly between the opposite sides of the disks and the companion spring jaws or clamps 78, this arrangement of the wires holding their ends securely so that the stroke of the plunger in advancing a charge of baling material shall result in the wire being paid out from the reels without disconnecting the ends of the wires from the retainers.

In the stroke of the plunger by which the first charge of the bale is advanced the wires (only one appears) are bent to approximately the position shown in Fig. 17 and at the same time such charge of material swings lever 90 from the position shown in dotted to the position shown in full lines Fig. 15, said lever working in the longitudinal slot 91 in the case and being mounted in brackets 92 secured to the case.

Mounted in guides 93 secured to the side of the case is a slide frame consisting of a bar 94 and a U-shaped portion with its arms 95 projecting forwardly and occupying horizontal planes above the stationary cutting blades 71 and a vertical plane between the movable cutting blades 69 and the case, and pendent from and carried by said arms are grooved rollers 96 which initially stand at the front ends of slots 89 forward of the wires extending therethrough, and for the purpose of transmitting the motion of lever 90 to said roller-carrying frame said parts are pivotally connected by a link 97.

The mechanism numbered 90 to 97 inclusive is for the purpose of providing slack in the wires between the retaining disks and the rear right hand corner of the bale, this slack being provided by the movement of rollers 96 from the position shown in Fig. 16 to the position shown in Figs. 17 and 18 where it will be noticed said rollers have doubled the wire between said retaining disks and the anti-friction roller 98 secured in the case contiguous to the rear right hand corner of the bale.

As the successive charges forming the bale are compressed by the plunger, the wires within the case move from the position shown in Fig. 17 to the positions shown in Figs. 18 to 20 inclusive, it being understood that to maintain the slack provided, a spring actuated pin 99 is mounted in a guide bracket 100 and snaps into a cavity 101 in bar 94 as said roller-carrying frame attains the position shown in Figs. 14 and 15, said spring-actuated pin being connected by a cable 102 to a gravity lever 103 mounted on bearing standard 55, the cable being guided over a sheave 104 also carried by said bearing. The lever under this gravitative tendency and the action of the spring-actuated pin is held normally against a stop pin 105 of bearing 55 with its lower end in the path of a beveled lug 106, of wheel 37, the arrangement being such that as the wheel rotates in the direction indicated by the arrow Fig. 2, the cam lug 106 operates the lever 103 and withdraws the spring-actuated pin from the cavity 101, and permits the retractile spring 107 connecting lever 90 with the case to swing said lever to its original position and therefore slides the roller-carrying frame forward until its rollers are again at the front ends of slots 89. As the spring actuated locking pin is thus stripped and the roller-carrying frame returns to its original position as explained, the crank arm 41 of shaft 39 starts downward and starts the needles on their reciprocatory travel, it being understood that one of the slowest parts of such reciprocatory movement is the initial part of its movement because the crank is longitudinally alined with link 42 at that time and therefore tends to swing said link laterally faster than it pulls it endwise. The needles move into the baling case through openings 108 and pass through the opposite wall of the case through vertically elongated openings 109, the upper needle being below the upper wire and the lower needle above the lower wire. Upon the return of the needles they engage the wires extending from the reels to the left hand side of the bale and draw it from the position shown in Fig. 18 to the position shown in Figs. 19 and 20, in the last part of the movement taking up the slack portions of the wires at the right hand side of the case as shown most clearly in Fig. 19.

For the purpose of picking up the wires and twisting them as hereinafter explained the needles are provided with vertical slots 110 near their pointed or beveled ends and fitting within said slots and pivoted on cross pins or bolts 111 are rock plates 112, coil springs 113 mounted on the pins or bolts between the rock plates and the walls of the slot being secured to said plates and walls and tending to throw the rock plate from the position shown in dotted to the position shown in full lines Fig. 9. When in their initial position the rock plates occupy the position shown by dotted lines and are held in such positions by the engagement of the spring-actuated pins 114 carried by the needles, with the peripheral notches 115 of the rock plates and in such position the rock plates stand as the needles make their advance movement into and across the baling case and said pins 114 are provided with laterally projecting handles 116 which pass freely through the openings in the right hand wall of the baling case but strike against and are repressed by the left hand wall until the pins 114 are withdrawn from notches 115 and as a result springs 113 rock said plates to the position shown in full lines Fig. 9. In such position it will be seen that the rollers or barbs 117 of the needles are in position to pick up the wires hereinbefore referred to on the return movement of the needles, said rollers being preferably journaled on pins or bolts 118 secured by nuts 119 to the rock plates, and will as soon as they attain their new position be locked thereat by the engagement with the notches 120 of the spring-actuated catches 121, arranged to operate laterally or at right angles to the movement of the rock plates. The spring-actuated catches 121 have handles 122 projecting through openings 123 in the opposite side of the needles from handles 116 and when said handles are pressed inward in a manner hereinafter explained, the spring-actuated catches swing into sockets 124 of the needles and out of the notches 121 of the rock plates, this release of the rock-plates by the spring-actuated catches occurring a little before the last revolution of the needles ends, as hereinafter referred to.

When the needles attain their original position after performing their reciprocatory action they have drawn the wires extending between the reel and the left hand side of the bale across the rear end of the latter and diagonally across from the reels, the surplus wire being paid out by the latter, the oblique portions of the wires bearing against the rear sides of the rollers 96 the wires also extending from the ends where held by the retainers outward around the barbs of the needles and inward to the rollers 98. As the needles attain this position they are revolved rapidly as hereinbefore explained and thus twist the four strands of wires together, it being noted in this connection that because the wires are doubled back around the barb and then twisted no expansive strain of the bale can disconnect the knot. During the last revolution of the needles in the twisting operation, the roller 125 carried by arm 126 of wheel 56 engages the cam surface 127 of the rock bar 128, pivoted on a stub shaft 129 projecting from bearing standard 55, a spring 130 surrounding the stub shaft and secured at its opposite ends to the latter and the rock bar tending to hold the latter in the position shown in full lines Fig. 7. As said roller 125 travels in the direction indicated by the arrow Fig. 7, it rocks the rock bar to cause the hammer-like cams 131, to move toward the vertical plane of the needles. As said hammer cams attain approximately the position shown in Fig. 11, the needles have completed about three-fourths of their last revolution and consequently have nearly finished the twisting or knotting of the wires. At said time the handle 122 of the spring-actuated catch strikes the contiguous cam ends of the hammers and are repressed by the latter so as to effect disengagement between the catches 121 and the notches 120 of the rock plates 112. As this occurs the tension of the twisted wires on the barbs 117 tends to rock plates 112 from the position shown in full lines Fig. 9 toward the position shown in dotted lines same figure, and while said rock plates are thus moving their rear portions come into engagement with the continuously advancing hammer cams and are rocked by the latter until the barbs are wholly withdrawn from the eyes of the wire, this action occurring at the instant that the needles complete their last twisting revolution and at the same time the roller 125 passes out of engagement with the rock bar 128 and permits the latter to be returned by spring 130 to its original position as shown in full lines Fig. 7; it being understood that as the withdrawal of the barbs from the eyes of the wires and cams occurs, the pins reëngage notches 115 and relock the rock plates in their initial position.

At the instant the twisting operation is completed the bar 67 is forced downward by one of the ends of the S-shaped cam 65, this action causing the blades 69 to sever the wire on the stationary blades 71, it being recalled however that the retainers 76 are clamping the strands of the wire leading directly from each reel to the needle, between said retainers and the spring clamps or jaws 78, as hereinbefore explained, so that when the cutting operation occurs, the ends of the wires from the reels at the opposite side of the case from the twists or knots shall be held reliably by the retainers, it being noticed also in this connection that with the formation of each bale the portions of the ends of the wires originally held by the retainers and cut between the latter and the needles will drop out of the retainers as waste.

In the twisting operation the beveled portions of the wires are of course shortened and therefore draw the needles toward the baling case, the springs 50 yielding sufficiently to accommodate this movement of the needles and returning the latter to their original positions as the wires are severed, it being also obvious that as such severance takes place the tension of the wires on the bale is relaxed and the expansion of the latter draws the twisted or knotted portions of the wires into the case through slots 89 and against the bale.

All future operations are repetitions of those described. No recapitulation of the entire operation is deemed necessary as the actions of the various parts have been explained in detail.

From the above description it will be apparent that we have produced a bale-tying mechanism for baling presses possessing the features of advantage enumerated and we wish it to be understood that we do not desire to be restricted to the exact details of construction shown and described as obvious modifications will suggest themselves to one skilled in the art.

Having thus described the invention what I claim as new and desire to secure by Letters Patent is:—

1. The combination with a baling press and means for causing a wire to encircle a bale formed in the press and form a pair of loops in the wire at one side of the bale, means for holding the portions of said loops at the opposite side of the points where they are doubled, from the bale, and means for twisting together the four portions of the doubled loops.

2. The combination with a baling press and means for causing a wire to encircle a bale formed in the press and form a pair of loops in the wire at one side of the bale, means for holding the portions of said loops at the opposite side of the points where they are doubled, from the bale, means for twisting the four portions of the doubled loops together, and means to effect the release of the twisted wire from the twisting means.

3. The combination with a baling press and means for causing a wire to encircle a bale formed in the press and form a pair of loops in the wire at one side of the bale, means for holding the portions of said loops at the opposite side of the points where they are doubled, from the bale, means for twisting the four portions of the doubled loops together, means to effect the release of the twisted wire from the twisting means, and means to sever one strand of each doubled portion between the twisted portion thereof and said holding means.

4. The combination with a baling press, of means for holding a coil of wire and means for holding the outer end of such wire at opposite sides of the baling case with the intermediate portion of the wire extending across the chamber thereof and engaging the opposite sides and front end of a bale formed therein, and means to engage the portion of the wire running from the coil to the bale and doubling it and also to engage that portion of the wire between the opposite side of the bale and said holding means and likewise doubling it.

5. The combination with a baling press, of means for holding a coil of wire and means to hold the outer end of such wire at opposite sides of the baling case with the intermediate portions of the wire extending across the chamber thereof and engaging the opposite sides and front end of a bale formed therein, means to engage the portion of the wire running from the coil to the bale and doubling it and also to engage that portion of the wire between the opposite side of the bale and said holding means and likewise doubling it, and means to twist the four contiguous strands of doubled wire together.

6. The combination with a baling press, of means for holding a coil of wire and means to hold the outer end of such wire at opposite sides of the baling case with the intermediate portions of the wire extending across the chamber thereof and engaging the opposite sides and front end of a bale formed therein, means to engage that portion of the wire running from the coil to the bale and doubling it and also to engage that portion of the wire between the opposite side of the bale and said holding means and likewise doubling it, means to twist the four contiguous strands of doubled wire together, and means to sever one of the strands of each doubled portion between the twisting and holding means.

7. The combination with a baling press, of means for holding a coil of wire and means to hold the outer end of such wire at opposite sides of the baling case with the intermediate portions of the wire extending across the chamber thereof and engaging the opposite sides and front end of a bale formed therein, means to engage that portion of the wire running from the coil to the bale and doubling it and in such action draw one portion of the wire across the rear end of the bale and the other diagonally across the chamber rearward of the bale and also engage and double that portion of the wire between the holding means and the contiguous side of the bale, and means to cause said wire-holding means to grip that portion of the doubled wire connecting the bale and coil, at a point between the coil and the means which doubled the wire.

8. The combination with a baling press, of means for holding a coil of wire, and means to hold the outer end of such wire at opposite sides of the baling case with the intermediate portions of the wire extending across the chamber thereof and engaging the opposite sides and front end of a bale formed therein, means to engage that portion of the wire running from the coil to the bale and doubling it and in such action draw that portion of the wire across the rear end of the bale and the other diagonally across the chamber rearward of the bale and also engage and double that portion of the wire between the holding means and the contiguous side of the bale, means to cause said wire-holding means to grip that portion of the doubled wire connecting the bale and coil at a point between the coil and the means which doubled the wire, and means to twist the four contiguous strands of the doubled wire together between the bale and holding means.

9. The combination with a baling press, of means for holding a coil of wire and means to hold the outer end of such wire, at opposite sides of the baling case with the intermediate portions of the wire extending across the chamber thereof and engaging the opposite sides and front end of the bale formed therein, means to engage that portion of the wire running from the coil to the bale and doubling it and in such action draw one portion of the wire across the rear end of the bale and the other diagonally across the chamber rearward of the bale and also engage and double that portion of the wire between the holding means and the contiguous side of the bale, means to cause said wire-holding means to grip that portion of the doubled wire connecting the bale and coil, at a point between the coil and the means which doubled the wire, means to twist the four contiguous strands of the doubled wire together between the bale and holding means, and means to sever one of the strands of each doubled portion between the twisting and holding means.

10. The combination with a baling press, a wire coil supporting device and a device for holding the outer end of the wire, at opposite sides of the baling case, a needle to reciprocate through the baling case between the holding device and a bale formed in the case, and means carried by the needle to engage the wire between the coil and the contiguous side of the bale and double it and carry said wire across to and through the opposite side of the case and then engage the wire between the opposite side of the bale and said holding means and likewise double it.

11. The combination with a baling press, a wire coil supporting device and a device for holding the outer end of the wire, at opposite sides of the baling case, a needle to reciprocate through the baling case between the wire-holding device and a bale formed in the case, means carried by the needle to engage the wire between the coil and the contiguous side of the bale and double it and carry said wire across to and through the opposite side of the case and then engage the wire between the opposite side of the bale and said wire-holding means and likewise double it, and means for causing the means carried by the needle to revolve and twist the four strands of the wire together, and means to disengage the part engaging the wire, from the latter.

12. The combination with a baling press, a wire coil supporting device and a device for holding the outer end of the wire, at opposite sides of the baling case, a needle to reciprocate through the baling case between the coil and wire-holding device and the bale formed in the case, means carried by the needle to engage the wire between the coil and the contiguous side of the bale and double it and carry said wire across to and through the opposite side of the case and then engage the wire between the opposite side of the bale and said wire-holding means and likewise double it, means for causing the means carried by the needle to revolve and twist the four strands of the wire together, means to disengage the part engaging the wire, from the latter, and means to sever one strand of each doubled portion between the twisted portion thereof and said holding means.

13. The combination with a baling case, a wire coil supporting device and a device for holding the outer end of the wire, at opposite sides of the baling case, a needle at the side of the case occupied by and outward of the wire-holding means, a barb for the needle out of the plane of the strands of the wire, means to reciprocate the needle across the baling chamber and back again behind the bale, means to project the barb into the plane of said strands of the wire after it passes the wire at the coil side of the case so that it shall pick up said strand and on its return movement double it behind the bale and then pick up the other strand and likewise double it.

14. The combination with a baling case, a wire coil-supporting device and a device for holding the outer end of the wire at opposite sides of the baling case, a needle at the side of the case occupied by and outward of the wire-holding means, a barb for the needle out of the plane of the strands of the wire, means to reciprocate the needle across the baling chamber and back again behind the bale, means to project the barb into the plane of said strands of the wire after it passes the wire at the coil side of the case so that it shall pick up said strand and on its return movement double it behind the bale and then pick up the other strand and likewise double it, and means to cause said holding means to grip the strand of the first-named doubled portion leading from the coil to said barb between the latter and the coil.

15. The combination with a baling case, a wire coil supporting device and a device for holding the outer end of the wire at opposite sides of the baling case, a needle at the side of the case occupied by and outward of the wire-holding means, a barb for the needle out of the plane of the strands of the wire, means to reciprocate the needle across the baling chamber and back again behind the bale, means to project the barb into the plane of the strands of the wire after it passes the wire at the coil side of the case so that it shall pick up said strand and on its return movement double it behind the bale and then pick up the other strand and likewise double it, means to cause said holding means to grip the strand of the first-named doubled portion leading from the coil to said barb between the latter and the coil, and means to revolve the needle to cause its barb to twist the four strands of the wire together.

16. The combination with a baling case, a wire coil supporting device and a device for holding the outer end of the wire, at opposite sides of the baling case, a needle at the side of the case occupied by and outward of the wire-holding means, a barb for the needle out of the plane of the strands of the wire, means to reciprocate the needle across the baling chamber and back again behind the bale, means to project the barb into the plane of the strands of the wire after it passes the wire at the coil side of the case so that it shall pick up said strand and on its return movement double it behind the bale and then pick up the other strand and likewise double it, means to cause said holding means to grip the strand of the first-named doubled portion leading from the coil to said barb between the latter and the coil, means to revolve the needle to cause its barb to twist the four strands of the wire together, and means to withdraw the barb from engagement with the twisted portions of the wire.

17. The combination with a baling case, a wire coil supporting device and a device for holding the outer end of the wire at opposite sides of the baling case, a needle at the side of the case occupied by and outward of the wire-holding means, a barb for the needle out of the plane of the strands of the wire, means to reciprocate the needle across the baling chamber and back again behind the bale, means to project the barb into the plane of the strands of the wire after it passes the wire at the coil side of the case so that it shall pick up said strand and on its return movement double it behind the bale and then pick up the other strand and likewise double it, means to cause said holding means to grip the strand of the first-named doubled portion leading from the coil to said barb between the latter and the coil, means to revolve the needle to cause its barb to twist the four strands of the wire together, means to withdraw the barb from engagement with the twisted portions of the wire and means to sever one strand of each of the doubled portions of the wire between the twist thereof and the wire holding means.

18. The combination with a baling press of a baling case having a slot in one wall and an opening opposite the same in the other wall, of a wire-guiding means rearward of said opening and slot at the same side of the press as the former, a device at the opposite side of the press rearward of the front end of the slot, for holding one end of a wire extending around a bale formed in the press, and means for slackening the wire between said holding device and the front end of said slot.

19. The combination with a baling press of a baling case having a slot in one wall and an opening opposite the same in the other wall, of a wire-guiding means rearward of said opening and slot at the same side of the press as the former, a device at the opposite side of the press rearward of the front end of the slot, for holding one end of a wire extending around a bale formed in the press, and reciprocatory means for slackening the wire between said holding device and the front end of said slot.

20. The combination with a baling press, of means for holding a coil of wire and means for holding the outer end of such wire at opposite sides of the baling case with the intermediate portion of the wire extending across the chamber thereof and engaging the opposite sides and front end of a bale formed therein, a movable frame mounted on the baling case and provided with a roller in the plane of said wire, and means to operate said frame to cause its roller to engage and bend or kink the wire between the baling case and the holding means.

21. The combination with a baling press, of means for holding a coil of wire and means for holding the outer end of such wire at opposite sides of the baling case with the intermediate portion of the wire extending across the chamber thereof and engaging the opposite sides and front end of a bale formed therein, a movable frame mounted on the baling case and provided with a roller in the plane of said wire, means to operate said frame to cause its roller to engage and bend or kink the wire between the baling case and the holding means, means to lock said frame in its new position until the final stroke of the plunger has occurred in the formation of the bale, means to travel across the baling case and back again at the rear end of the bale and draw the wire across the case and against the rear end of the bale and double it and likewise double the kinked or slack portion of the wire, and means to effect the withdrawal of the slack producing frame just prior to the action of the means for doubling said wires.

22. The combination with a baling press, of means for holding a coil of wire and means for holding the outer end of such wire, at opposite sides of the baling case with the intermediate portion of the wire extending across the chamber thereof and engaging the opposite sides and front end of a bale formed therein, a movable frame mounted on the baling case and provided with a roller in the plane of said wire, means to operate said frame to cause its roller to engage and bend or kink the wire between the baling case and the holding means, means to lock said frame in its new position until the final stroke of the plunger has occurred in the formation of a bale, means to travel across the baling case and back again at the rear end of the bale and draw the wire across the case and against the rear end of the bale and double it and likewise double the kinked or slack portion of the wire, means to effect the withdrawal of the slack producing frame just prior to the action of the means for doubling said wires, means to cause the wire-holding means to grip the wire extending from the coil to the means which doubled the wire, means to twist the doubled strands of the wire together, means to effect the disengagement of the twisting means from the wire, and means to sever the wire between the twisted portions and the wire-holding means.

23. The combination with a baling press of a device for holding one end of a wire extending around a bale formed in the press, means for doubling the wire between the holding means and the bale, means for twisting together the portions of the wire which are doubled, and means to yieldingly resist movement of the twisting means induced by the shortening of the doubled portions of the wire by twisting them together.

24. The combination with a baling press of a device for holding one end of a wire extending around a bale formed in the press, means for doubling the wire between the holding means and the bale, means for twisting together the portions of the wire which are doubled, means to yieldingly resist movement of the twisting means induced by the shortening of the doubled portions of the wire by twisting them together, and means to sever the wire between the holding means and the twisted portion.

25. The combination with a baling press, of means for holding a coil of wire, and means to hold the outer end of such wire, at opposite sides of the baling case, with the intermediate portions of the wire extending across the chamber thereof and engaging the opposite sides and front end of a bale formed therein, means to engage the portion of the wire running from the coil to the bale and doubling it and also to engage that portion of the wire between the opposite side of the bale and said holding means and likewise doubling it, means to twist the four contiguous strands of the doubled wire together, and means to yieldingly resist movement of the twisting means induced by the shortening of the doubled portions of the wire by twisting them.

26. The combination with a baling press, a wire coil supporting device and a device for holding the outer end of the wire, at opposite sides of the baling case, a needle to reciprocate through the baling case between the holding device and the bale formed in the case, means carried by the needle to engage the wire between the coil and the contiguous side of the bale and double it and carry said wire across to and through the opposite side of the case and then engage the wire between the opposite side of the bale and said holding means and likewise double it, means to rotate the means engaging the wire to twist the doubled portions of the same together, and means to yieldingly resist movement of said engaging means induced by the shortening of the doubled portions of the wire by twisting them together.

27. The combination with a baling press, a pair of transversely arranged needles at one side of the same, movable barbs carried by the needles and normally disposed out of the plane of the baling wires, means to reciprocate said needles to cause them to travel transversely through the baling press behind the bale formed therein and back again, means to project the barbs into the plane of the wires when the needles reach the first half of their reciprocatory movement to compel the barbs to double the wires, means to rotate the needles to twist the doubled portions of the wires together, means to yieldingly resist longitudinal movement of the needles during the twisting operation, and means to withdraw the barbs from the eyes or loops in the twisted portions of the wires at about the moment the twisting action terminates.

28. The combination with a baling press of a baling case having a slot in one wall and an opening opposite the same in the other wall, of a wire-guiding means rearward of said opening and slot at the same side of the press as the former, a device at the opposite side of the press rearward of the front end of the slot for holding one end of a wire extending around a bale formed in the press, a needle to reciprocate through the slot and opening of the press from a point outward of said slot and holding means and adapted on its return stroke to engage that portion of the wire contiguous to the opening and double it and draw the same transversely through the press and said slot and near the end of said return movement also engage that portion of the wire between the front end of the slot and holding means and likewise double the same.

29. The combination with a baling press of a baling case having a slot in one wall and an opening opposite the same in the other wall, of a wire-guiding means rearward of said opening and slot at the same side of the press as the former, a device at the opposite side of the press rearward of the front end of the slot for holding one end of a wire extending around a bale formed in the press, a needle to reciprocate through the slot and opening of the press from a point outward of said slot and holding means and adapted on its return stroke to engage that portion of the wire contiguous to the opening and double it and draw the same transversely through the press and said slot and near the end of said return movement also engage that portion of the wire between the front end of the slot and holding means and likewise double the same, and means to twist the four contiguous strands of the doubled wire together.

30. The combination with a baling press, of a device for holding one end of a wire extending around a bale formed in the press, means for engaging that portion of the wire engaging the opposite side of the bale from the wire-holding device and disposing a portion of the same against the rear end of the bale and for also doubling that portion of the wire extending from the holding device to the contiguous side of the bale, and means for twisting the four portions of the wire formed by thus doubling the same, together.

31. The combination with a baling press, of a device for holding one end of a wire extending around a bale formed in the press, means for engaging that portion of the wire engaging the opposite side of the bale from the wire-holding device and disposing a portion of the same against the rear end of the bale and for also doubling that portion of the wire extending from the holding device to the contiguous side of the bale, means for twisting together the four portions of the wire formed by thus doubling the same, and means to cause the holding device to grip the wire contiguous to the doubled portion and not in engagement with the rear end of the bale.

32. The combination with a baling press, of a device for holding one end of a wire extending around a bale formed in the press, means for engaging that portion of the wire engaging the opposite side of the bale from the wire-holding device and disposing a portion of the same against the rear end of the bale and for also doubling that portion of the wire extending from the holding device to the contiguous side of the bale, means for twisting together the four portions of the wire formed by thus doubling the same, means to cause the holding device to grip the wire contiguous to the doubled portion and not in engagement with the rear end of the bale, and means to sever the two portions of the wire between the points where they are gripped and the twisted portion.

In testimony whereof we affix our signature, in the presence of two witnesses.

CLARENCE E. BOWER.
HOWARD W. BOWER.

Witnesses to signature of C. E. Bower:
   H. C. RODGERS,
   G. Y. THORPE.
Witnesses to signature of H. W. Bower:
   H. T. DEWHIRST,
   A. KAUFMAN.